N. L. HEINZ & J. W. GEIB.
CONCENTRATING APPARATUS.
APPLICATION FILED SEPT. 15, 1915.
1,277,922.
Patented Sept. 3, 1918.
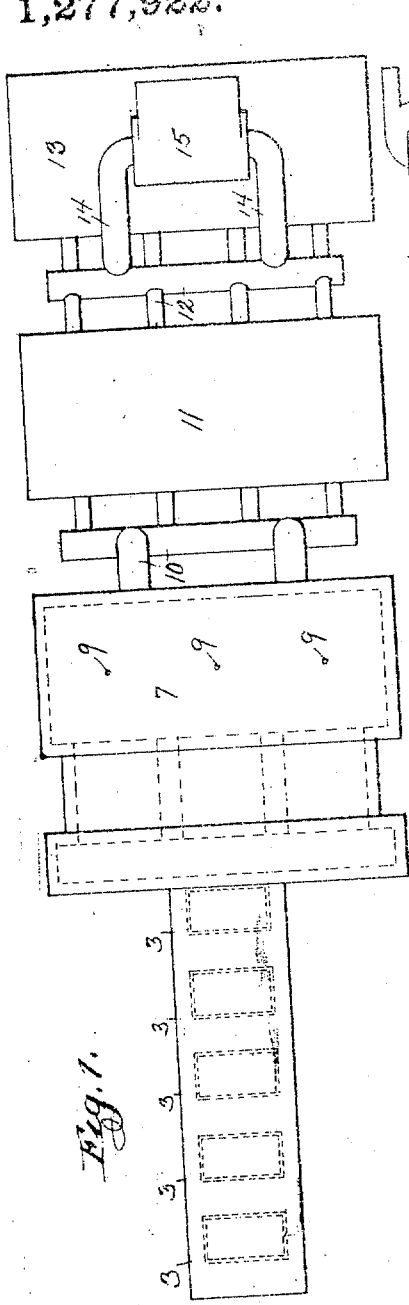
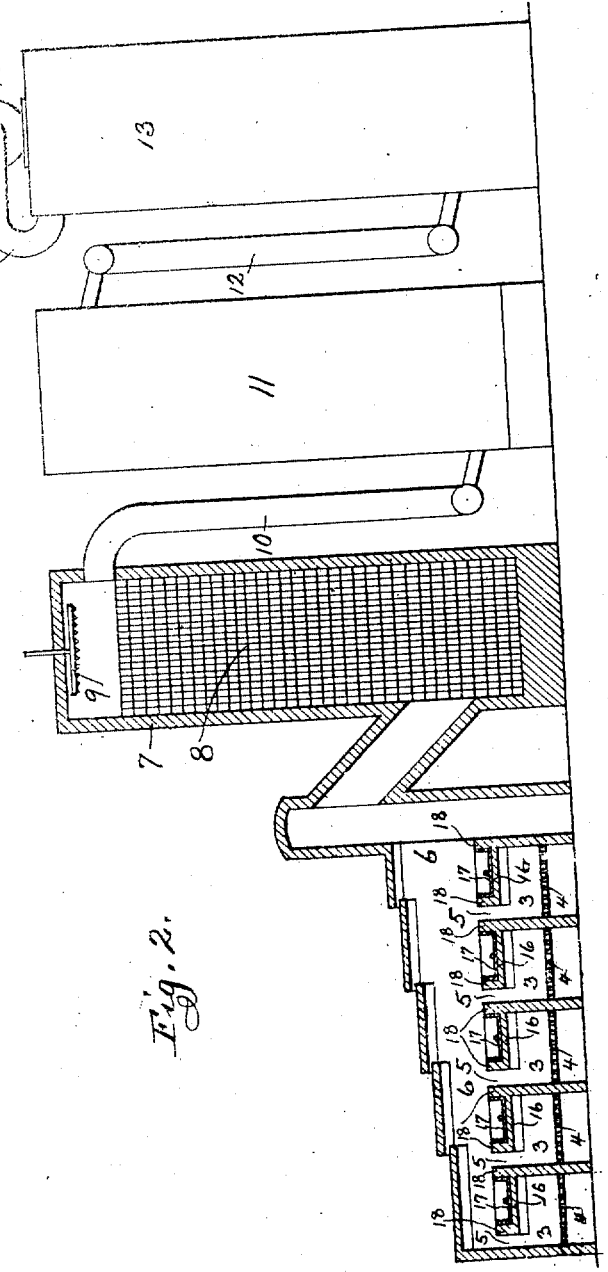
Witness:
E D Jacker
Inventors:
Nicholas L. Heinz and
John W. Geib
By Richd J. Jacke
Atty

UNITED STATES PATENT OFFICE.

NICHOLAS L. HEINZ AND JOHN W. GEIB, OF LA SALLE, ILLINOIS.

CONCENTRATING APPARATUS.

Specification of Letters Patent.  Patented Sept. 3, 1918.

Application filed September 15, 1915. Serial No. 50,909.

*To all whom it may concern:*

Be it known that we, NICHOLAS L. HEINZ and JOHN W. GEIB, citizens of the United States, residing at La Salle, in the county of La Salle and State of Illinois, have jointly invented a new and useful Concentrating Apparatus, of which the following is a specification.

Our invention relates to apparatus for concentrating sulfuric acid, salts, etc., and the objects of our improvements are; first, to concentrate acid etc., to a high degree; second, to have the vaporizing process or action take place above the pans; third, to have the pans protected by fire brick; fourth, to provide means to prevent the pans from breaking or cracking; fifth, to make a simple and durable apparatus and other features to become apparent from the description to follow.

In the process of concentrating acids, salts, etc., and especially when concentrating sulfuric acid to a consistency above 66 degrees Baume' or 93.5 per cent. $H_2SO_4$, it becomes necessary to employ evaporating pans in connection with a high degree of heat. Heretofore these pans have been placed over a furnace fire and would often become cracked or broken from the extreme heat, which would cause a delay or interruption in the work and of course decrease the efficiency of the apparatus and by the use of our invention these objectionable features are eliminated.

To describe our invention so that others versed in the art to which it pertains can make and use the same we have illustrated it on the accompanying drawing forming a part of this specification, in which—

Figure 1, is a plan view of an apparatus embodying our invention and Fig. 2, is a vertical sectional view of the same.

Similar reference characters refer to similar parts throughout the several views.

A plurality of furnaces are shown at 3, comprising the grates 4 and flues 5; the latter converging into a common flue 6 which leads to the concentrating tower 7. The tower 7 is filled with a checkerwork of brick 8 and is provided with the customary distributer 9 at the top through which the weaker acid is admitted. The brick 8 in tower 7 of course are heated by the hot gases from the furnaces 3 which enter the tower 7 at the bottom and pass upward around the brick 8 and out at the top through the flues 10, and thence enter the lower end of the condensing tower 11. As the weaker acid which is admitted through the distributer 9 trickles down over the hot brick 8, some of the water therein contained is carried off in the form of vapor by the upwardly passing hot gases and into the condensing tower 11. The stronger acid which trickles down through between the brick 8 and reaches the bottom of the tower is drawn off in the usual way.

After passing through the condensing tower 11, the vapor containing gases pass out through the flues 12 at the top of the tower 11 and thence pass into the lower end of a second condensing tower 13 and from thence out at the top of said tower 13 through the flue 14 which leads to a suitable suction fan 15.

The weak acid is drained from the bottom of the condensing towers 11 and 13 in the usual way.

Each furnace 3 is provided with an overhead arch 16 upon which rests a cast iron pan 17 which has its four side walls protected from the intense heat by suitable brick 18.

Thus it is clear that the hot gases from the fire on grate 4 cannot come into direct contact with the iron pan 17, but will pass immediately above the pan through flue 6, and in this manner the sulfuric acid in the pans 17 is concentrated to the desired consistency greater than 66 degrees Baume' or 93.5 per cent. $H_2SO_4$.

The pans 17 are provided with suitable supply and discharge ports not shown for the purpose of emptying and filling the same.

It will be understood that the size, material and arrangement of the parts may be varied without in the least departing from the scope of our invention.

Having thus fully described our invention what we claim as new and desire to secure by Letters Patent of the United States is:—

1. In a concentrating apparatus, a plurality of furnaces arranged in a row, a liquid containing pan over each furnace, a condensing tower at one end of the row of furnaces and a flue extending over the row of pans and connecting with the tower whereby each pan will be separately heated and the fumes from all the pans will pass through the same flue to the tower.

2. In a concentrating apparatus, a plurality of furnaces arranged in a row, an arch over each furnace, a liquid containing pan on each arch and a flue above the pans connected by branch flues with the furnaces, said flues being so arranged that the hot gases from the furnaces and the fumes from the pans will mingle and pass to the same tower.

In testimony whereof we have signed our names to this specification in presence of witnesses on the 2nd day of September, 1915, at Pittsburgh, Pennsylvania, and on the 23rd day of August, 1915, at Isabella, Tennessee, respectively.

NICHOLAS L. HEINZ.
JOHN W. GEIB.

Witnesses:
MARGARET M. SMITH,
J. F. ANDERSON.